(12) United States Patent  (10) Patent No.: US 7,725,441 B2
Balasubramanian et al.  (45) Date of Patent: May 25, 2010

(54) METHODS, SYSTEMS, AND COMPUTER PROGRAM PRODUCTS FOR DISASTER RECOVERY PLANNING

(75) Inventors: Srinivasan Balasubramanian, San Jose, CA (US); Tushar Mohan, Waltham, MA (US); Roberto C. Pineiro, Santa Cruz, CA (US); Rohit Jain, New Delhi (IN); Ramani R. Routray, San Jose, CA (US); Gauri Shah, Santa Clara, CA (US); Akshat Verma, New Delhi (IN); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 11/953,115

(22) Filed: Dec. 10, 2007

(65) Prior Publication Data

US 2009/0150456 A1  Jun. 11, 2009

(51) Int. Cl.
 *G06F 17/30* (2006.01)
(52) U.S. Cl. ...................... 707/675; 707/686
(58) Field of Classification Search ................ 707/674, 707/675, 686; 714/15, 16, 20
See application file for complete search history.

(56) References Cited

U.S. PATENT DOCUMENTS

| 7,246,254 | B2 * | 7/2007 | Alur et al. ....................... 714/2 |
| 7,502,961 | B2 * | 3/2009 | van Ingen et al. .............. 714/21 |
| 7,567,974 | B2 * | 7/2009 | Wahlert et al. ............... 707/102 |
| 7,574,459 | B2 * | 8/2009 | Sen et al. ..................... 707/204 |
| 2006/0053178 | A1 * | 3/2006 | van Ingen et al. ........... 707/204 |
| 2006/0053347 | A1 * | 3/2006 | van Ingen et al. ............. 714/47 |
| 2006/0143161 | A1 * | 6/2006 | Munro .......................... 707/3 |
| 2008/0133300 | A1 * | 6/2008 | Jalinous ........................ 705/7 |

OTHER PUBLICATIONS

Frabutt, Alan, "Special Report: Implementing Your Disaster Recovery Plan", SMS, 1999, 5p, V4-12.

* cited by examiner

*Primary Examiner*—Hung T Vy
(74) *Attorney, Agent, or Firm*—Cantor Colburn LLP; Brian Lambert

(57) ABSTRACT

Formulating an integrated disaster recovery (DR) plan based upon a plurality of DR requirements for an application by receiving a first set of inputs identifying one or more entity types for which the plan is to be formulated, such as an enterprise, one or more sites of the enterprise, the application, or a particular data type for the application. At least one data container representing a subset of data for an application is identified. A second set of inputs is received identifying at least one disaster type for which the plan is to be formulated. A third set of inputs is received identifying a DR requirement for the application as a category of DR Quality of Service (QoS) class to be applied to the disaster type. A composition model is generated specifying one or more respective DR QoS parameters as a function of a corresponding set of one or more QoS parameters representative of a replication technology solution. The replication technology solution encompasses a plurality of storage stack levels. A solution template library is generated for mapping the application to each of a plurality of candidate replication technology solutions. The template library is used to select a DR plan in the form of a replication technology solution for the application.

3 Claims, 3 Drawing Sheets

METHODS, SYSTEMS, AND COMPUTER PROGRAM PRODUCTS FOR DISASTER RECOVERY PLANNING

CROSS-REFERENCE TO RELATED APPLICATIONS

This application contains subject matter which is related to the subject matter of U.S. Pat. No. 7,246,254, issued on Jul. 17, 2007 and filed on Jul. 16, 2003, by Nagraj Ramachandran Alur, Vitthal M. Gogate, Inderpal Singh Narang, Ramani Ranjan Routray, and Mahadevan Subramanian, incorporated herein by reference in its entirety, and assigned to the same assignee as the present application, International Business Machines Corporation of Armonk, N.Y.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention generally relates to data storage on computer systems, and more particularly to methods for backing up and recovering physically or logically damaged resources on that data storage. Specifically, this invention relates to a method for formulating an integrated disaster recovery plan based upon a plurality of requirements for each of a plurality of data types.

2. Description of Background

Disaster recovery (DR) solutions for information technology (IT) systems encompass application servers, networks and storage systems. In the case of storage systems, there are a plethora of point replication solutions that may be used for providing disaster recovery. As a general consideration, system designers formulate an appropriate DR plan or solution based on user requirements, and then the DR solution is deployed.

At present, DR solution planning is a manual, error prone and time consuming process. The solution space is quite large, with the result that designers may not devise the most cost effective solution. In the storage domain, designing DR solutions is complex because designers have to choose from among various competing alternatives. For example, a typical IT system environment may include an application stack in the form of an application running on top of a database system that is, in turn, running on top of a file system. The file system may obtain its volumes via a volume manager. Finally, the volume manager could, in turn, obtain its storage from a storage controller. In this type of environment, a DR solution can be formulated at the database more than one of the foregoing levels. Selecting an appropriate technology for implementing the DR solution is not a trivial matter. This selection is typically determined with reference to the relative costs of various data replication solutions and level, the file system level, the volume manager level, the storage controller level, or at the DR needs applicable to a given type of data.

DR solution designers are required to design a cost effective disaster recovery solution for an enterprise that may consist of multiple locations and applications. Each application may, in turn, be dealing with many different classes of data each having different DR requirements. Finally, each respective class of application data may require protection for a different type of corresponding disaster, such as virus attacks, machine failure, and site failure. Determining the number of sites and copies to satisfy the foregoing enterprise requirements is not an easy task. As a result, designers generally over-provision the required amount of DR resources.

In many cases, DR solution designers are required to formulate solutions for an existing environment. In these situations, the designer must first assess whether or not it is possible for the existing environment to support all applicable DR requirements. If it is determined that the existing environment has the potential to support these requirements, the designer must then determine how to extend the existing environment to address these requirements in a cost effective manner.

There are very few individuals who possess the necessary expertise to design effective DR solutions. Moreover, the expertise of these individuals is often restricted to a specific category of replication technology (e.g, controller replication or database replication). The DR solutions devised by these individuals rely upon a group of best practices that have proven effective in view of practical experience and empirical observations. Unfortunately, these best practices have not been automated and consolidated into the DR solution process for the purpose of making these practices available to a greater number of designers. Further, the solutions generated by these experts must be deployed in terms of replication sessions for various technologies, which is a manual and error-prone process.

A number of database and third party software vendors provide backup and recovery solutions at the database level, and some claim to offer data recovery at the application level as well. These solutions generate a recovery job with the relevant object names and syntax required to execute the backup and recovery function, along with management tools that track the generated backup. However, these data recovery solutions are intended for single site and may not function effectively in environments which include a multitude of sites. Moreover, these recovery solutions lack a mechanism for determining the optimal technologies to use for backup and recovery tasks. No mechanism is provided to develop optimal schedules for backup. No mechanism exists to determine optimal recovery strategies. Additionally, no mechanism is provided to adapt and refine DR techniques in environments that have dynamically changing application workloads, business objectives, and hardware/software infrastructure. What is lacking is a holistic view of all data stores (databases and files) of an application for data recovery that may span multiple eclectic systems. Accordingly, what is needed is a method for automatically generating a DR solution for use in multi-site IT environments. The need for such a method has heretofore remained unsatisfied.

SUMMARY OF THE INVENTION

A computer-implemented method formulates an integrated disaster recovery (DR) plan based upon a plurality of DR requirements for an application. The method receives a first set of one or more inputs identifying an entity type for which the plan is to be formulated, wherein the entity type comprises an enterprise, one or more sites of the enterprise, the application, a particular data type for the application, or any combination thereof. Based upon the received entity type, at least one data container is identified, the data container representing a subset of data for an application. For each identified data container, a second set of one or more inputs is received, each of the second set of one or more inputs identifying a disaster type for which the plan is to be formulated. For each disaster type, a third set of one or more inputs is received, each of the third set of one or more inputs identifying a DR requirement for the application as a category of DR Quality of Service (QoS) class to be applied to the disaster type. The third set of one or more inputs is utilized to generate a composition model specifying each of one or more respective DR QoS parameters as a function of a corresponding set of one or more QoS parameters representative of a replication technology solution. The replication technology solution encompasses a plurality of storage stack levels including two or more of an application level, a database level, a file system level, or a disk controller level. The composition model is used to generate a solution template library mapping the application to each of a plurality of candidate replication technology solutions. The template library is used to select a DR plan in the form of a replication technology solution for the application.

System and computer program products corresponding to the above-summarized methods are also described and claimed herein. Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
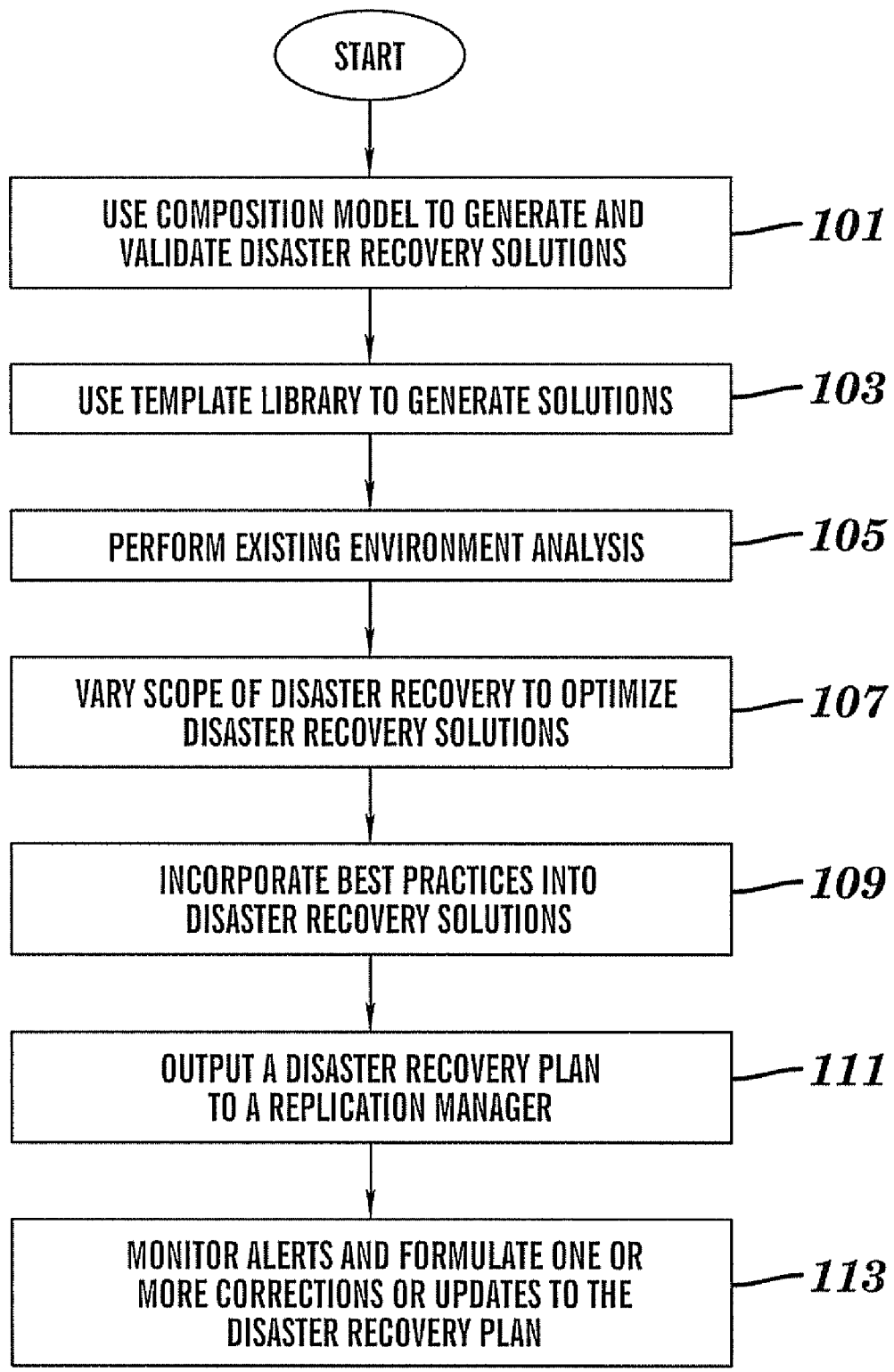
FIG. 1 illustrates a first exemplary method for performing heterogeneous multi-site disaster recovery planning.

FIG. 1 illustrates a first exemplary method for performing heterogeneous multi-site disaster recovery (DR) planning. The method (planning tool) is unique because it considers block storage, volume, file, and database level disaster recovery planning in an integrated manner. Further, it creates a unified plan for multiple applications hosted across multiple sites. By taking a holistic view, the tool is able to provide solutions that utilize a mix of various technologies instead of restricting the solution to one technology as represents the current or prevailing practice among DR experts. The planning tool is also unique because it considers and chooses between many different types of long distance connection technologies such as DWDM multiplexers, channel extenders, IP gateways etc. Finally, in addition to considering different types of software such as DBMSs, LVM, file systems, hardware such as disk based storage controllers, tapes, optical media, the planning tool also considers storage virtualization and replication boxes.

With reference to block 101, Composition Models are used to generate/validate DR Solutions. The Composition Models are used to represent a composition of replication technologies illustratively belonging to each of a plurality of different tiers in a storage stack. A Composition Model specifies a plurality of DR Quality of Service (QoS) parameters (such as Recovery Time Objective (RTO), Recovery Point Objective (RPO), application latency impact, resource overhead such as CPU and I/O overhead) as a function of the QoS parameters of individual replication technologies in the composition. The Composition Model is at an abstract level that hides the details of individual replication products but captures the essential properties of the replication technology. The Composition Model provides two important functionalities:

(i) creation of complicated heterogenous composite solution templates to meet the DR needs of an application and (ii) evaluating solutions in existing environment that can meet the needs of an application.

With reference to block 103, a Template Library is used to generate Solutions. More specifically, the template library is used to create replication solutions that meet the DR needs of an application. The templates abstract out the unnecessary details of a technology and capture the core properties of the replication solutions. Once the abstract template is instantiated with exact replication solutions, these details are filled in. The use of abstract templates help in pruning the search space very quickly as pruning a single template prunes out a large number of replication technologies that are captured by the template.

Illustratively, blocks 101 and 103 are performed such that the Composition Model is used to generate templates for the template library. Additionally or alternatively, if templates are already available, the method of FIG. 1 can directly use these templates without using the Composition Model, thus bypassing block 101.

With reference to block 105, Existing Environment Analysis is performed. In situations where there is an existing environment, the planning tool first checks to see whether the existing configuration can satisfy the DR requirements. If it cannot, then the tool subsequently performs planning and proposes the necessary extensions to the existing setup. The tool also allows the users to make hypothetical changes to their environment and check whether it still satisfies the DR requirements. None of the existing DR planning tools consider existing environments and propose necessary extensions to them. The powerful composition model described previously allows one to perform the Existing Environmental Analysis in a flexible manner.

Varying DR Scope optimization: With reference to block 107, the planning tool can perform DR planning at the enterprise level, site level, application level, for a particular data type of an application, or for a particular type of disaster for a particular data type of an application. The users can either explicitly choose the desired level at which they want the tool to optimize, or they can ask the tool to provide the most optimum (cost wise or using other criteria like host CPU utilization or network utilization etc) solution after considering all the different levels. Any existing optimization method that provides optimal DR solutions at any of these levels could be plugged in our tool and used. None of the previous planning tools have any such notions as what is described in this point.

Incorporation of best practices: With reference to block 109, the planning tool provides a mechanism that allows DR solution experts to enter new DR best practices or planning constraints. Thus, the solutions proposed by this tool do not violate these best practices. It is important to note that most DR solution designers will not accept the plans proposed by a tool if they violate known best practices. Integration with Replication Engines: With reference to block 111, the planning tool outputs a DR solution in the form of a DR plan. The DR plan may formulate a solution in terms of workflows.

Illustratively, the DR solution is provided in a form that complies with a standard known as the Common Information Model (CIM). The Common Information Model (CIM) is a computer industry standard for defining device and application characteristics so that system administrators and management programs will be able to control devices and applications from different manufacturers or sources in the same way. For example, a company that purchased different kinds of storage devices from different companies would be able to view the same kind of information (such as device name and model, serial number, capacity, network location, and relationship to other devices or applications) about each of them or be able to access the information from a program. CIM takes advantage of Extensible Markup Language (XML). Hardware and software makers choose one of several defined XML schemas (information structures) to supply CIM information about their product.

In situations where block 111 outputs the DR plan in a form that complies with CIM, any CIM-compliant replication manager can automatically deploy this plan. For those legacy planners that are not CIM compliant, the method of FIG. 1 may further include writing drivers that automatically convert the CIM elements into commands used by proprietary technology of a legacy planner. Optionally, block 111 could, but need not, output the DR plan in a form capable of being directly fed to a replication manager (illustratively TotalStorage® Productivity Center for Replication, or TPC RM). In view of the foregoing, the method of FIG. 1 eliminates the requirement of human intervention in instantiating a DR Plan as the output of the planning tool consists of both Schematic Description of the DR Plan—(for human use) and TPC RM Commands—(for direct deployment of the plan without need of human intervention).

Monitoring and Automatic Plan Correction: With reference to block 113, the planning tool allows for both automatic and user defined definition of alerts on the key disaster recovery service class attributes such as RTO, RPO, and latency. If changes occur in the underlying SAN configurations at the primary or secondary (or tertiary sites), the foregoing alerts are triggered. These alerts are monitored, and corrections to the existing plan are proposed or formulated. The user is given the option of either revising the proposed plan or accepting the plan and letting the system act upon it.

Figure 2:
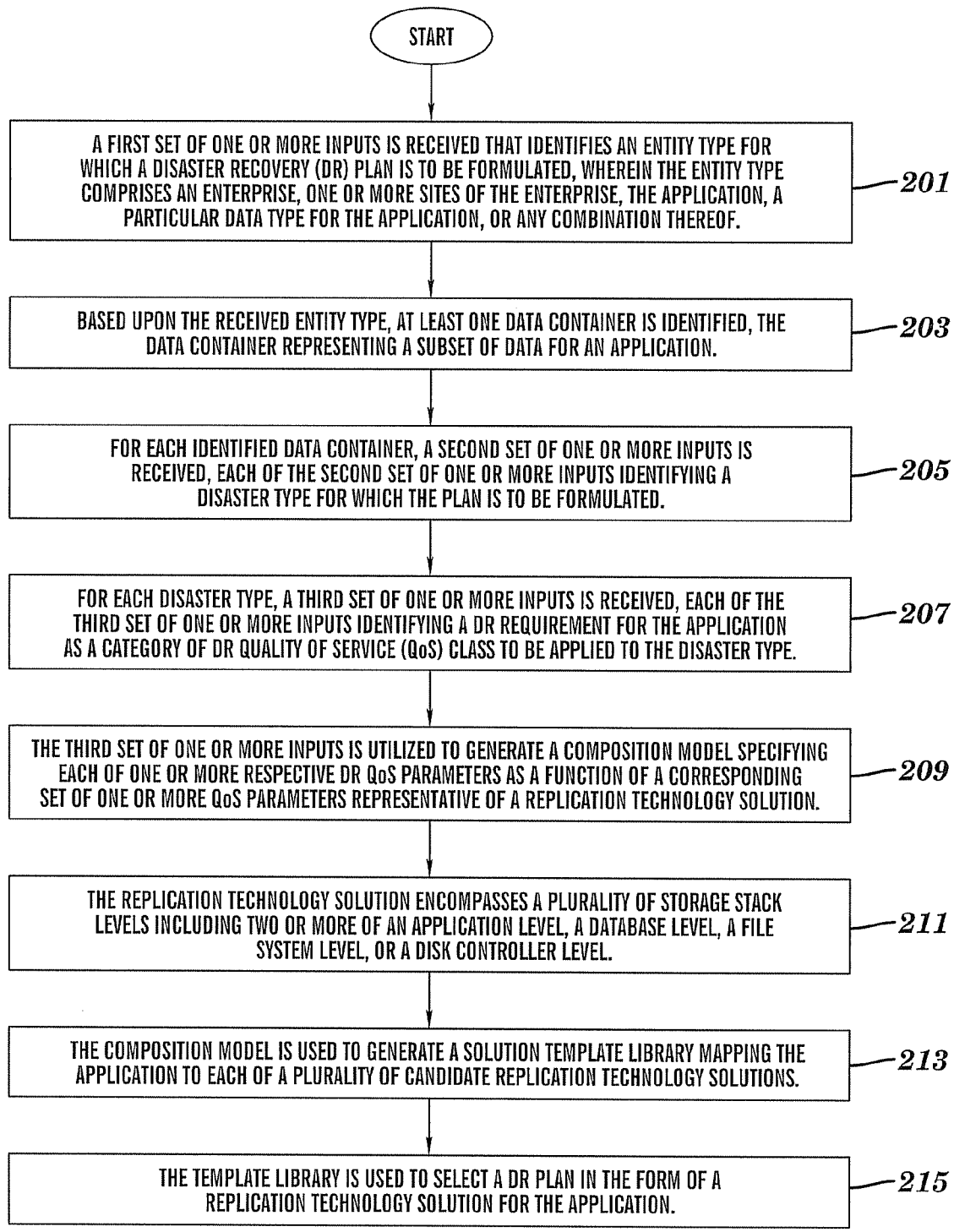
FIG. 2 illustrates a second exemplary method for performing heterogeneous multi-site disaster recovery planning.

FIG. 2 illustrates a second exemplary method for performing heterogeneous multi-site disaster recovery planning. The method of FIG. 2 formulates an integrated disaster recovery (DR) plan based upon a plurality of DR requirements for an application. The method commences at block 201 where a first set of one or more inputs is received that identifies an entity type for which the plan is to be formulated, wherein the entity type comprises an enterprise, one or more sites of the enterprise, the application, a particular data type for the application, or any combination thereof. Next, at block 203, based upon the received entity type, at least one data container is identified, the data container representing a subset of data for an application.

The procedure advances to block 205 where, for each identified data container, a second set of one or more inputs is received, each of the second set of one or more inputs identifying a disaster type for which the plan is to be formulated. For each disaster type, a third set of one or more inputs is received, each of the third set of one or more inputs identifying a DR requirement for the application as a category of DR Quality of Service (QoS) class to be applied to the disaster type (block 207). The third set of one or more inputs is utilized to generate a composition model specifying each of one or more respective DR QoS parameters as a function of a corresponding set of one or more QoS parameters representative of a replication technology solution (block 209). The replication technology solution encompasses a plurality of storage stack levels including two or more of an application level, a database level, a file system level, or a disk controller level (block 211). The composition model is used to generate a solution template library mapping the application to each of a plurality of candidate replication technology solutions (block 213). Illustratively, blocks 209 and 213 are performed such that the Composition Model is used to generate templates for the template library. Additionally or alternatively, if templates are already available, the method of FIG. 2 can directly use these templates without using the Composition Model, thus bypassing blocks 209 and 213.

The template library is used to select a DR plan in the form of a replication technology solution for the application (block 215). A typical IT system environment may include an application stack in the form of an application running on top of a database system that is, in turn, running on top of a file system. The file system may obtain its volumes via a volume manager. Finally, the volume manager could, in turn, obtain its storage from a storage controller. In this type of environment, and with reference to block 215 of FIG. 2, the DR plan in the form of the replication technology solution for the application (i.e., a DR solution) can be formulated at the database level, the file system level, the volume manager level, the storage controller level, or at more than one of the foregoing levels. Additionally or alternatively, the application may be running on a virtual machine wherein the volume is available through a virtualization appliance from a backend storage controller.

Figure 3:
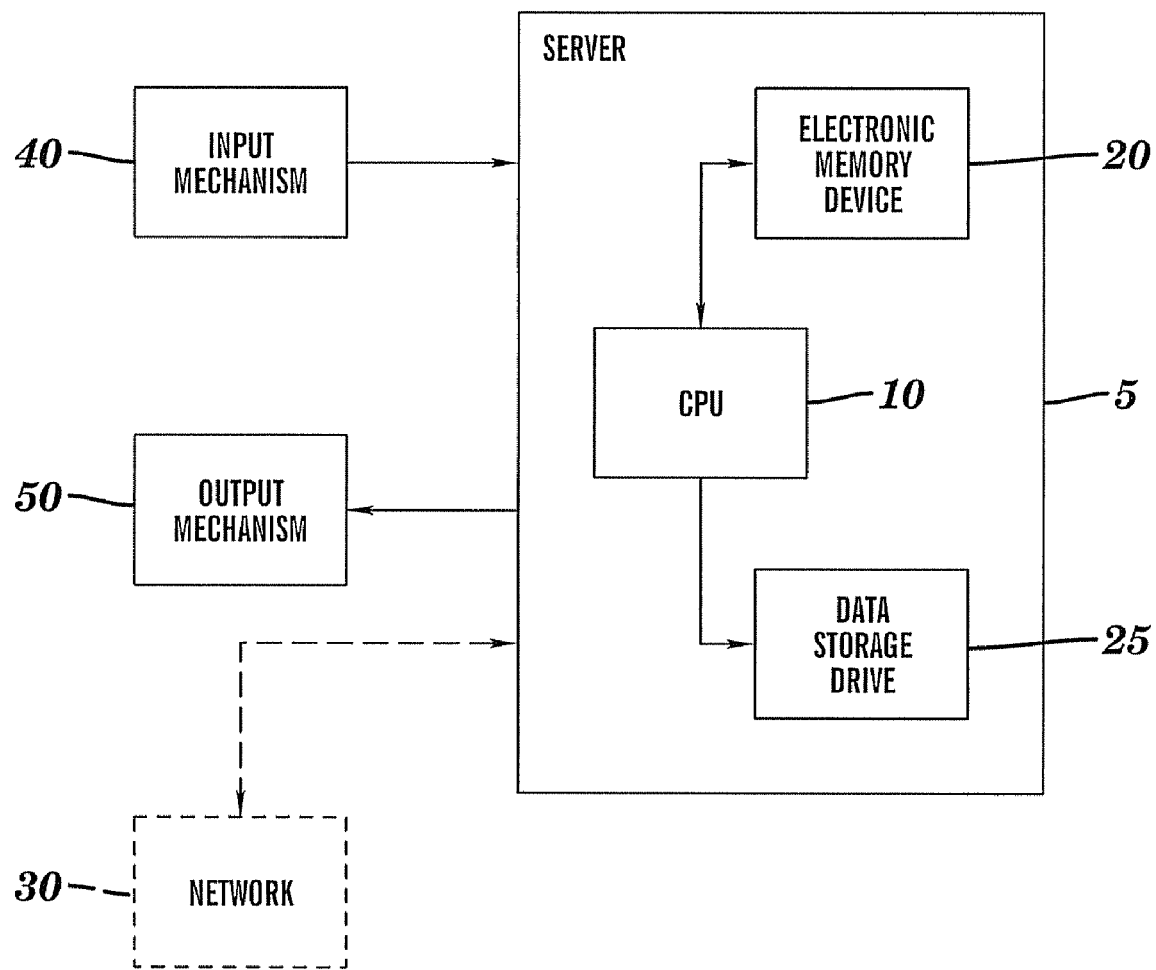
FIG. 3 is a hardware block diagram depicting an illustrative apparatus for performing any of the disaster recovery methods depicted in FIG. 1 or 2.

FIG. 3 is a hardware block diagram depicting an illustrative apparatus for performing any of the disaster recovery methods depicted in FIG. 1 or 2. A server 5 is employed to formulate a disaster recovery (DR) plan. Server 5 includes a central processing unit (CPU) 10 operatively coupled to a computer readable medium. Optionally, the server 5 is operatively coupled to a network 30. Although FIG. 3 shows a single server 5 operatively coupled to the network 30, the disaster recovery methods of FIGS. 1 and 2 could, but need not, be implemented by a plurality of servers operatively coupled to the network 30. Network 30 may represent, for example, a local area network (LAN), a wide area network (WAN), a wireless network, the Internet, an intranet, the public switched telephone network, or any of various combinations thereof.

In the example of FIG. 3, the computer readable medium includes at least one of an electronic memory device 20 or a data storage drive 25. Electronic memory device 20 may represent, for example, read-only memory (ROM), random access memory (RAM), a buffer memory device, a cache, another type of electronic memory, or any of various combinations thereof. Data storage drive 25 may represent, for example, a disk drive, a magnetic storage drive, an optical storage device, an optical reading mechanism capable of reading a CD or a DVD, a portable USB memory device, another type of storage drive, or any of various combinations thereof. The computer readable storage medium includes instructions which, when executed, causes the server 5 to execute any of the methods described previously in connection with FIGS. 1 and 2. For example, the instructions may be stored on the computer readable storage medium itself, or the instructions may be stored on a CD or DVD that is read by an optical reading mechanism. The computations for formulating a disaster recovery plan are performed in CPU 10 and the results are stored in data storage drive 25. Electronic memory device 20 is used to store intermediate computations for formulating the disaster recovery plan.

Server 5 is operatively coupled to an input mechanism 40 and an output mechanism 50. Illustratively, input mechanism 40 is implemented using a keyboard, keypad, computer mouse, touch-sensitive display screen, interactive voice response unit (IVR), data storage drive, or any of various combinations thereof. A single data storage drive or set of drives could, but need not, be used to implement input mechanism 40 and data storage drive 25. Output mechanism 50 is illustratively implemented using a printer, display device, data storage drive, or any of various combinations thereof. Input mechanism 40 and output mechanism 50 may, but need not, be implemented using the same device or set of devices.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While various preferred embodiments of the invention have been described, it will be understood that those skilled in the art, both now and in the future, may make various improvements and enhancements which fall within the scope of the claims which follow. These claims should be construed to maintain the proper protection for the inventions described herein.

What is claimed is:

1. A computer-implemented method of formulating an integrated disaster recovery (DR) plan based upon a plurality of DR requirements for an application, the method comprising:

receiving a first set of one or more inputs identifying an entity type for which the plan is to be formulated, wherein the entity type comprises an enterprise, one or more sites of the enterprise, the application, a particular data type for the application, or any combination thereof;

based upon the received entity type, identifying at least one data container representing a subset of data for an application;

for each identified data container, receiving a second set of one or more inputs each identifying a disaster type for which the plan is to be formulated;

for each disaster type, receiving a third set of one or more inputs each identifying a DR requirement for the application as a category of DR Quality of Service (QoS) class to be applied to the disaster type;

utilizing the third set of one or more inputs to generate a composition model specifying each of one or more respective DR QoS parameters as a function of a corresponding set of one or more QoS parameters representative of a replication technology solution; and formulating the replication technology solution using the composition model;

wherein the formulated replication technology solution encompasses a plurality of storage stack levels including two or more of an application level, a database level, a file system level, or a disk controller level.

2. A computer program product for formulating an integrated disaster recovery (DR) plan based upon a plurality of DR requirements for an application, the computer program product comprising a storage medium readable by a processing circuit and storing instructions for execution by the processing circuit for facilitating a method comprising:

receiving a first set of one or more inputs identifying an entity type for which the plan is to be formulated, wherein the entity type comprises an enterprise, one or more sites of the enterprise, the application, a particular data type for the application, or any combination thereof;

based upon the received entity type, identifying at least one data container representing a subset of data for an application;

for each identified data container, receiving a second set of one or more inputs each identifying a disaster type for which the plan is to be formulated;

for each disaster type, receiving a third set of one or more inputs each identifying a DR requirement for the application as a category of DR Quality of Service (QoS) class to be applied to the disaster type;

utilizing the third set of one or more inputs to generate a composition model specifying each of one or more respective DR QoS parameters as a function of a corresponding set of one or more QoS parameters representative of a replication technology solution; and formulating the replication technology solution using the composition model;

wherein the formulated replication technology solution encompasses a plurality of storage stack levels including two or more of an application level, a database level, a file system level, or a disk controller level.

3. A system for formulating an integrated disaster recovery (DR) plan based upon a plurality of DR requirements for an application, the system comprising:

input means for receiving a first set of one or more inputs, a second set of one or more inputs, and a third set of one or more inputs; the first set of one or more inputs identifying an entity type for which the plan is to be formulated, wherein the entity type comprises an enterprise, one or more sites of the enterprise, the application, a particular data type for the application, or any combination thereof;

processing means, operatively coupled to the input means, for identifying at least one data container representing a subset of data for an application based upon the received entity type;

wherein, for each identified data container, the second set of one or more inputs identifies a disaster type for which the plan is to be formulated;

wherein, for each disaster type, the third set of one or more inputs identifies a DR requirement for the application as a category of DR Quality of Service (QoS) class to be applied to the disaster type;

the processing means utilizing the third set of one or more inputs to generate a composition model specifying each of one or more respective DR QoS parameters as a function of a corresponding set of one or more QoS parameters representative of a replication technology solution; and formulating the replication technology solution using the composition model, wherein the formulated replication technology solution encompasses a plurality of storage stack levels including two or more of an application level, a database level, a file system level, or a disk controller level;

and an output mechanism, operatively coupled to the processing means, for displaying or printing the replication technology solution, or for storing the replication technology solution in electronic form.

* * * * *